US011197436B2

(12) United States Patent
Cole

(10) Patent No.: US 11,197,436 B2
(45) Date of Patent: Dec. 14, 2021

(54) INTERNAL WICKING COLLECTION RESERVOIR FOR PLANT CONTAINERS

(71) Applicant: Joshua T. Cole, Whitefish, MT (US)

(72) Inventor: Joshua T. Cole, Whitefish, MT (US)

( * ) Notice: Subject to any disclaimer, the term of this patent is extended or adjusted under 35 U.S.C. 154(b) by 187 days.

(21) Appl. No.: 16/591,074

(22) Filed: Oct. 2, 2019

(65) Prior Publication Data

US 2020/0113145 A1    Apr. 16, 2020

Related U.S. Application Data

(60) Provisional application No. 62/743,878, filed on Oct. 10, 2018.

(51) Int. Cl.
*A01G 27/06*    (2006.01)
*A01G 27/00*    (2006.01)
*A01G 29/00*    (2006.01)

(52) U.S. Cl.
CPC .......... *A01G 27/06* (2013.01); *A01G 27/001* (2013.01); *A01G 29/00* (2013.01)

(58) Field of Classification Search
CPC ...... A01G 27/06; A01G 27/04; A01G 27/001; A01G 27/006; A01G 27/005
See application file for complete search history.

(56) References Cited

U.S. PATENT DOCUMENTS

| 3,786,598 | A | * | 1/1974 | Stadelhofer | A01G 27/005 47/81 |
| 4,339,891 | A | * | 7/1982 | Bassett | A01G 27/04 47/71 |
| 5,535,542 | A | * | 7/1996 | Gardner | A01G 27/04 47/18 |
| 9,485,924 | B1 | * | 11/2016 | Frye | A01G 27/06 |
| 9,516,821 | B1 | * | 12/2016 | Conrad, Jr. | A01G 27/06 |
| 2011/0131879 | A1 | * | 6/2011 | Altendorfer | A01G 27/04 47/81 |
| 2013/0318872 | A1 | * | 12/2013 | van der Starre | A01G 9/02 47/66.6 |
| 2020/0305356 | A1 | * | 10/2020 | Hansord | A01G 27/06 |

FOREIGN PATENT DOCUMENTS

| EP | 3473085 A1 * | 4/2019 | ........ A01G 13/0281 |
| WO | WO-2019142951 A1 * | 7/2019 | ............ A47G 7/02 |

OTHER PUBLICATIONS

Machine translation of WO-2019142951-A1 (Year: 2021).*

* cited by examiner

*Primary Examiner* — Timothy D Collins
*Assistant Examiner* — Madeline L Douglas
(74) *Attorney, Agent, or Firm* — Stoel Rives LLP

(57) ABSTRACT

Devices used to provide water to a container plant are disclosed. The devices may be configured to collect and retain water from saturated soil and then to distribute the collected water to dry soil. The devices may comprise a reservoir, a collection lid, and a wick. The devices may be configured to be disposed within a plant container.

19 Claims, 5 Drawing Sheets

INTERNAL WICKING COLLECTION RESERVOIR FOR PLANT CONTAINERS

RELATED CASES

This application claims priority to U.S. Provisional Application No. 62/743,878, filed on Oct. 10, 2018, and titled "Internal Wicking Collection Reservoir for Plant Containers," which is hereby incorporated by reference in its entirety.

TECHNICAL FIELD

The present disclosure relates generally to devices used to provide water to container plants. More specifically, the present disclosure relates to plant watering devices disposed within a plant container that collect excess water in a reservoir and dispense the excess water into soil surrounding roots of a plant via a wick.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
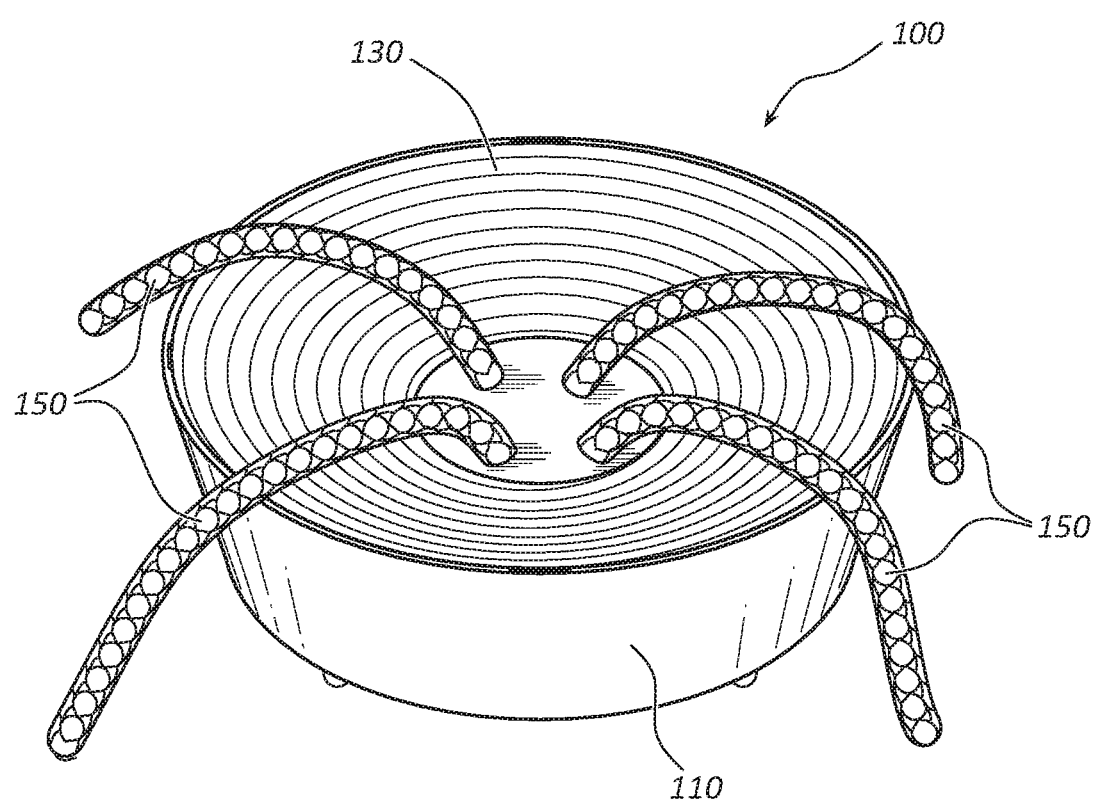
FIG. 1 is a perspective view of a plant watering device.

Overwatering may be a cause of death for container plants. In an effort to care for plants, owners often saturate the plant's soil and leave the lower roots submerged in water. Most planting containers sit in a collection dish meant to protect supporting surfaces from water damage. While these are somewhat effective for protecting furniture and floors when plants are overwatered, collection dishes allow water to collect in the base of the planting container, submersing the roots. Submersing the lower roots prohibits oxygen from reaching the root ball which promotes fungal growth and eventually leads to root rot, killing the plant. Aside from the damage that overwatering does to the plant, it can also lead to property damage when collection dishes overflow.

In certain instances, using the disclosed internal collection reservoir, the majority of the water that would be lost in overwatering is directed into and stored in a reservoir below the plants roots. The water in the reservoir may be redistributed back into the soil with wicks. In some circumstances, this maintains soil homeostasis helping to prevent over and under watering.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

"Fluid" is used in its broadest sense, to refer to any fluid, including both liquids and gases as well as solutions, compounds, suspensions, etc., which generally behave as fluids.

FIGS. 1-5 illustrate different views of a plant watering device or apparatus and system. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIG. 1 depicts an embodiment of a plant watering device 100. In the illustrated embodiment, the plant watering device 100 is comprises a reservoir 110, a lid 130, and a plurality of wicks 150. FIG. 1 shows the plant watering device in a ready to use state where the lid 130 is coupled to and covers the reservoir 110 and the wicks 150 extend from the lid 130.

Figure 2:
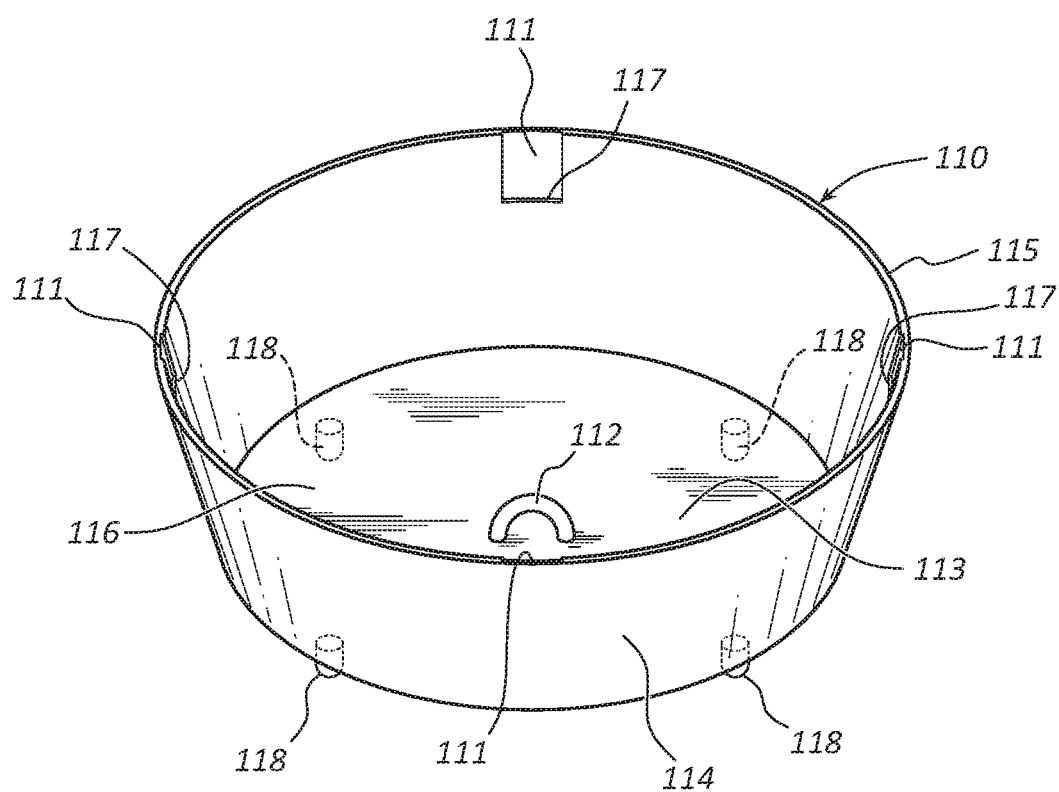
FIG. 2 is a perspective view of a reservoir of the plant watering device of FIG. 1.

In reference to FIG. 2, the reservoir 110 is a fluid tight container. The reservoir 110 is shown having a circular shape. In some embodiments, the reservoir 110 may have any shape configured to be disposed within a plant container of a similar shape. For example, the reservoir 110 may have a rectangular shape to be disposed within a rectangular shaped plant container. In other embodiments, the plant container may be of any suitable shape, such as square, triangular, oval, elliptical, polygonal, etc. and the reservoir 110 may be similarly shaped to the plant container and may be sized to be disposed within a plant container. The reservoir 110 may be formed from any suitable material, such as polypropylene, polyethylene, polycarbonate, acrylic, steel, aluminum, clay, etc. The reservoir may be manufactured using any suitable technique, such as injection molding, thermoforming, machining, casting, spinning, pressing, etc. The reservoir 110 may be transparent, translucent, or opaque and may be of any suitable color or colors.

The reservoir 110 includes a sidewall 114 and a bottom wall 116 having an upper surface 113. The sidewall 114 may extend substantially perpendicular from the bottom wall 116 to a lip 115. In other embodiments, the sidewall 114 may angle radially outward and upward from the bottom wall 116. A height of the sidewall 114 may range from 1 cm to 25 cm, from 2 cm to 8 cm, and from 2 cm to 4 cm. The height of the sidewall 114 may be a sufficient height as to occupy a certain percentage of the plant container. For example, 10% of the height of the plant container, 20% of the height of the plant container, 30% of the plant container, etc. As shown in FIG. 2, the sidewall 114 includes a tab receiving member 111 disposed in an inner surface of an upper portion of the sidewall 114. In other embodiments, the sidewall 114 may include multiple tab receiving member 111, such as 2, 3, 4, 5, or more tab receiving members 111, that are circumferentially equally spaced around an inside perimeter of the reservoir 110. The tab receiving member 111 includes a notch 117. In other embodiments, the tab receiving member 111 may include a smooth surface. The reservoir 110 may include a plurality of support members or feet 118 that extend downward from the bottom wall 116. The feet 118 may elevate the reservoir 110 from the bottom of the plant container to create a space for fluid drainage from the plant container.

A wick securement member 112 is disposed on the upper surface 113 of the bottom wall 116. The wick securement member 112 may be configured to secure the wick 150 to the upper surface 113 such that the wick 150 contacts fluid covering the upper surface 113. As shown in FIG. 2, the wick securement member 112 is a loop or arch extending upward from the upper surface 113. The wick 150 may pass through the arch and may be secured to the upper surface 113. In other embodiments, the wick securement member may be of any suitable form, such as a button, tab, etc. The middle portion of the wick 150 may be secured by to the upper surface 113 by the wick securement member 112 where the wick 150 forms a loop with opposite ends extending from the securement member 112. In other embodiments, a first end of the wick 150 may be secured by the wick securement member 112 and a second end of the wick 150 may extend from the wick securement member 112.

Figure 3A:
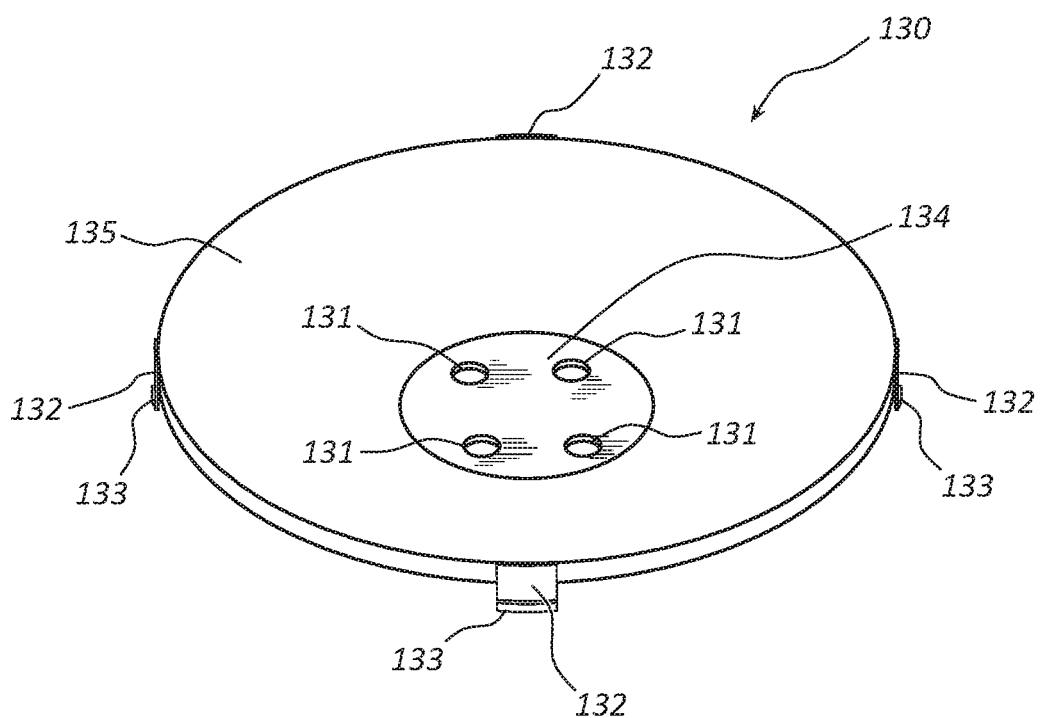
FIG. 3A is a top view of a lid of the plant watering device of FIG. 1.
Figure 3B:
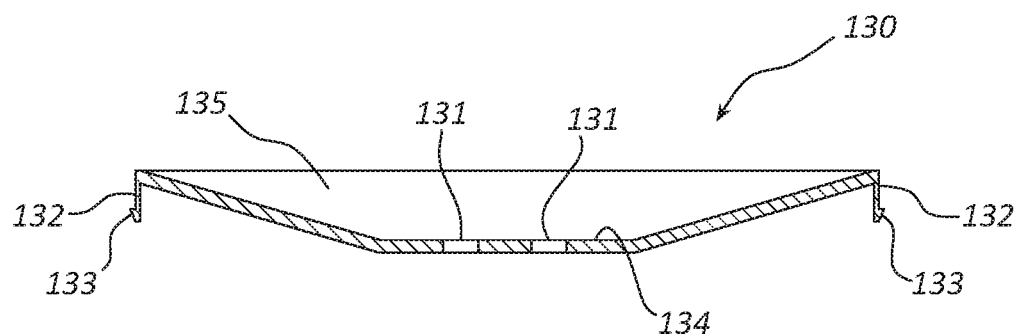
FIG. 3B is a cross-sectional side view of the lid of FIG. 1.

Referring to FIGS. 3A-3B, the lid 130 is shown to have a circular shape to match the circular shape and size of the reservoir 110. In other embodiments, the lid 130 may have any suitable shape and size to match the shape and size of the reservoir 110 that it is coupled to. The lid 130 may be formed from the same material used to form the reservoir 110 as previously described. In other embodiments, the lid 130 may be formed from a material different from the material used to form the reservoir 110.

The lid 130 includes a tapered portion 135, a central collection portion 134, and a securement tab 132. The tapered portion 135 extends from a perimeter of the lid 130 to the central collection portion 134. The angle of the tapered portion 135 may range from 0 degrees to 15 degrees, from 3 degrees to 10 degrees, and from 4 degrees to 6 degrees. A surface of the tapered portion 135 may be smooth. In some embodiments, the tapered portion 135 may include radially inwardly extending channels. In some embodiments, the tapered portion may include a spiraling channel that spirals around the central collection portion 134 from a perimeter of the lid 130 to the central collection portion 134. The spiraling channel is configured to direct fluid to the central collection portion 134. In some embodiments, the tapered portion 135 may include a plurality of radially directed channels that are configured to direct fluid to the central collection portion 134. The central collection portion 134 is horizontal relative to the perimeter of the lid 130. The central collection portion 134 includes a wick passageway 131 configured to permit passage of the wick 150 from the reservoir 110 and to frictionally retain the wick 150 or in other words provide interference of the passage of the wick 150. The wick 150 may be configured to block soil from entering the reservoir 110 through the wick passageway 131 by occupying the entire wick passageway 131. In some embodiments, the central collection portion 134 may include a plurality of wick passageways 131. For example, the central collection portion 134 may include 2, 4, 6, or more wick passageways 131.

In some embodiments, the lid 130 may include a plurality of seed wells. Each seed well may include a wick passageway 131 configured for passage of the wick 150 from the reservoir 110 to the seed well. In other embodiments, the lid 130 and wick 150 may be disposed within a plant container without the reservoir 110. The lid 130 may frictionally engage an internal wall of the plant container adjacent a bottom of the plant container, thereby defining a fluid chamber between the bottom of the plant container and the lid 130. In another embodiment, the lid 130 may sit on a ring support adjacent the bottom of the plant container. In another embodiment, the lid 130 may have a plurality of feet that extend downward and engage with the bottom of the plant container. The lid 130 may provide a fluid chamber between the lid 130 and the bottom of the plant container. In yet another embodiment, the lid 130 may sit on vertical supports extending upward from the bottom of the plant container. A water chamber may be defined under the lid 130 and the wick 150 may be disposed in the water chamber.

The securement tab 132, as shown in FIG. 3B, extends downward from the perimeter of the lid 130. The securement tab 132 is configured to secure the lid 130 to the reservoir 110. The securement tab 132 includes a detent 133 configured to releasably couple with the notch 117 of the tab receiving member 111 of FIG. 2. In some embodiments, the securement tab 132 may frictionally couple with the tab receiving member 111. In other embodiments, the lid 130 may include a plurality of securement tabs 132. For example, the lid 130 may include 2, 3, 4, 5, or more securement tabs 132.

Figure 4A:
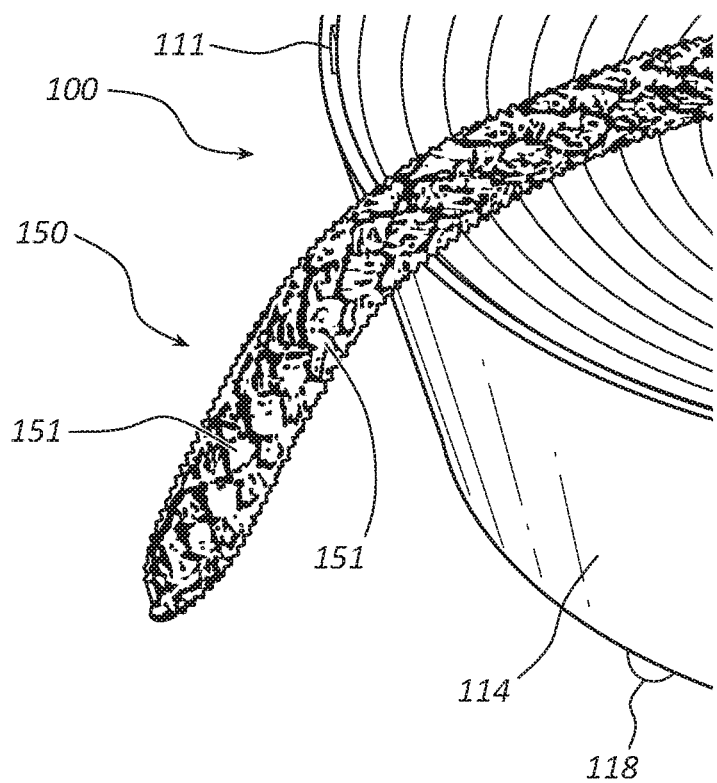
FIG. 4A is a detailed perspective view of a wick of the plant watering device of FIG. 1.
Figure 4B:
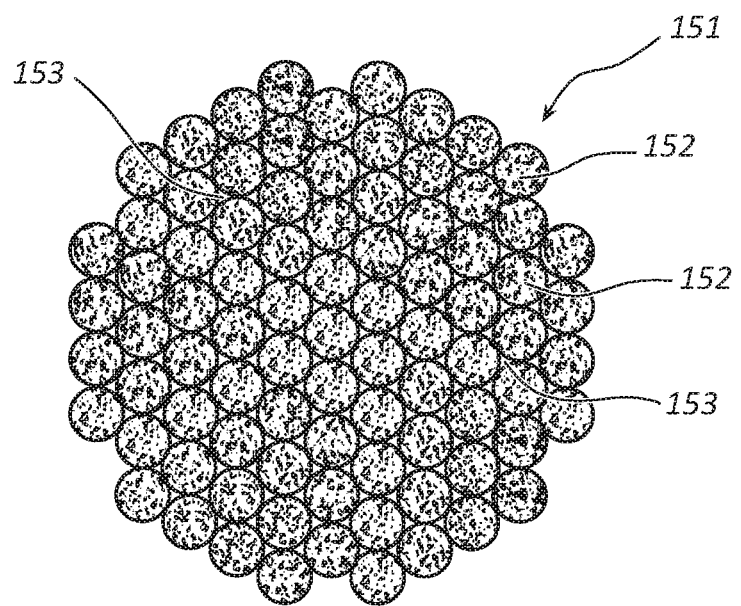
FIG. 4B is a transverse cross-sectional view of a bundle of strands of the wick of FIG. 4A.

FIGS. 4A-4B depict the wick 150. The wick 150 may include a bundle 151 of strands 152. In other embodiments, the wick 150 may include a plurality of bundles 151 coupled together in a woven form. For example, the wick 150 may include 2, 3, 4, 5, or more bundles 151 woven together. In certain embodiments, the wick 150 may include a hollow core. A diameter of the wick 150 may range from 2 mm to 8 mm, from 4 mm to 8 mm, and from 5 mm to 7 mm. The strands 152 may be formed as a monofilament from any suitable, moisture non-absorbing material, such as polypropylene, polyethylene, nylon, etc.

FIG. 4B illustrates a transverse cross-section of the strands 152 of the bundle 151. The strands 152 may have a circular shape. An interstitial space 153 may be defined between the individual strand 152 and an adjacent strand 152. The interstitial space 153 is configured to wick fluid, such as water, via capillary force.

Figure 5:
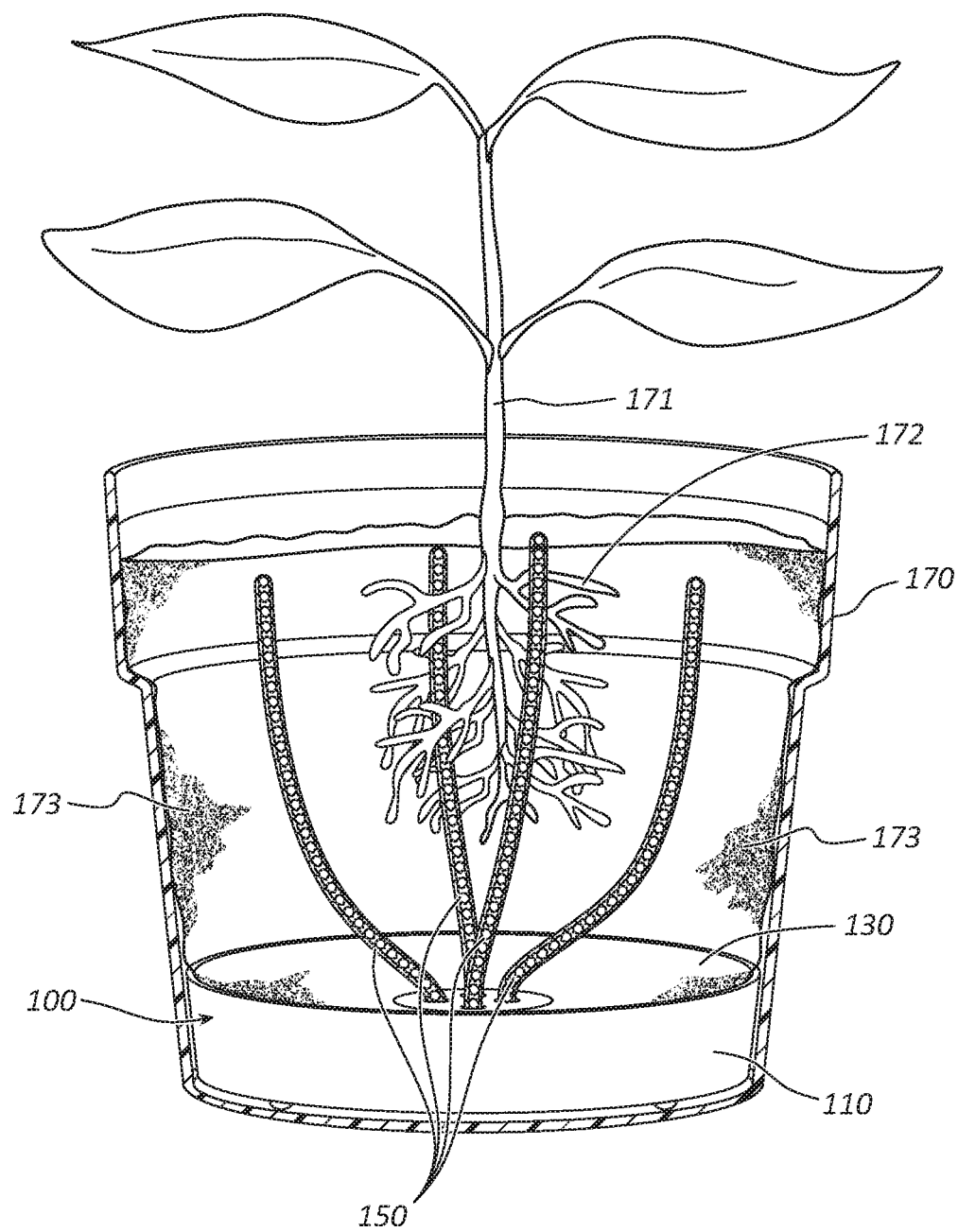
FIG. 5 is side cutaway view of the plant watering device of FIG. 1 disposed within a plant container.

In use, the plant watering device 100 may be used to collect excess water from a plant container in the reservoir 110 and to distribute the excess water to soil surrounding the roots of a plant as the soil dries. Referring to FIG. 5, the plant watering device 100, including the reservoir 110, the lid 130, and the wicks 150, may be prepared for use by securing the wicks 150 to the bottom surface of the reservoir 110 using the wick securement member 112 (shown in FIG. 2). The wicks 150 may be passed through the wick passageways 131 such that the wicks 150 extend away from the lid 130. The lid 130 may be coupled to the reservoir 110 with the tabs 132 (shown in FIG. 3B) coupled to the tab receiving members 111 (shown in FIG. 2). The plant watering device 100 may be disposed within a plant container 170. The plant watering device 100 can be positioned adjacent to a bottom of the plant container 170. The wicks 150 may extend upward from the lid 130. In an untrimmed state, the wicks 150 may extend above the plant container 170 and can be draped over a lip of the plant container 170. Soil 173 can be disposed within the plant container 170 on top of the lid 130. A portion of a plant 171 may be disposed in the soil 173 such that the soil 173 surrounds a root 172 of the plant 171. In other instances, a plant seed may be disposed within the soil 173. FIG. 5 depicts the wicks 150 in a trimmed state where the wicks 150 are trimmed at or below the level of the soil 173. In other embodiments, the wicks 150 may be trimmed above the surface of the soil 173.

When the plant 171 is watered, water may be absorbed into the soil 173 and the wick 150. When the soil becomes saturated, water that is not absorbed by the soil 173 and the wick 150 may be pulled downward by gravity and contact the lid 130. The tapered portion 135 may direct the water to the central collection portion 134. The water collected in the central collection portion 134 may contact the wick 150 and fill the interstitial spaces 153 (shown in FIG. 4B). Capillary forces may draw the water through the interstitial spaces 153 from the central collection portion 134 into the reservoir 110.

When the soil 173 is not saturated with water or dry, water retained in the reservoir 110 may fill the interstitial spaces 153 of the wick 150 and the water may be drawn from the reservoir 110 by capillary force. The capillary force may draw the water to a height of from 0 cm to 20 cm, from 8 cm to 16 cm, and from 12 cm to 16 cm above the lid 130. The water in the interstitial spaces 153 may be dispersed into the soil such that water is provided to the roots 172 of the plant 171.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A plant watering device, comprising:
   a reservoir;
   a lid coupled to the reservoir and configured to collect a fluid; and
   a wick coupled to the reservoir and extending through the lid, wherein the lid comprises:
      a tapered portion and a central portion, wherein the tapered portion is tapered toward the central portion; and
      a spiraling channel disposed in the tapered portion and in fluid communication with the central portion,
   wherein the plant watering device is configured to be disposed within a plant container.

2. The plant watering device of claim 1, wherein the reservoir is configured to retain a fluid.

3. The plant watering device of claim 1, wherein the reservoir comprises a wick retention member configured to retain the wick adjacent a bottom surface of the reservoir.

4. The plant watering device of claim 1, wherein the lid comprises a radially inward downwardly sloped upper surface.

5. The plant watering device of claim 1, wherein the lid comprises a passageway configured to frictionally engage the wick.

6. The plant watering device of claim 1, wherein the lid comprises a securement tab configured to couple with a securement tab receiver of the reservoir.

7. The plant watering device of claim 1, wherein the wick comprises a plurality of strands.

8. The plant watering device of claim 7, wherein the plurality of strands are bundled together to form a bundle.

9. The plant watering device of claim 8, wherein a plurality of interstitial spaces are defined between the plurality of strands of the bundle.

10. The plant watering device of claim 9, wherein the plurality of interstitial spaces are configured to wick fluid.

11. The plant watering device of claim 8, wherein the wick comprises a plurality of woven bundles.

12. The plant watering device of claim 1, wherein the wick is configured to transport fluid into and out of the reservoir.

13. The plant watering device of claim 1, wherein the wick is configured to transport fluid from a soil to the reservoir when the soil is saturated with water and to transport fluid from the reservoir to the soil when the soil is dry.

14. The plant watering device of claim 9, wherein the plurality of interstitial spaces wick fluid from zero cm to 20 cm along a longitudinal axis of the wick.

15. A plant watering system, comprising:
a plant container; and
a plant watering apparatus comprising:
   a reservoir;
   a lid comprising:
      a tapered portion and a central portion, wherein the tapered portion is tapered toward the central portion; and
      a spiraling channel disposed in the tapered portion and configured to direct fluid to the central portion; and
   a wick,
wherein the plant watering apparatus is disposed within the plant container.

16. The plant watering device of claim 15, wherein the wick is configured to transport fluid into and out of the reservoir.

17. The plant watering system of claim 15, wherein the wick is configured to transport fluid from the soil to the reservoir when the soil is saturated with water and to transport fluid from the reservoir to the soil when the soil is dry.

18. A plant watering device, comprising:
a lid disposed within a plant container defining a fluid chamber beneath the lid, wherein the lid is configured to collect fluid, and wherein the lid comprises:
   a tapered portion and a central portion, wherein the tapered portion is tapered toward the central portion; and
   a spiral shaped channel disposed in the tapered portion and around the central portion, wherein the spiral shaped channel is in fluid communication with the central portion; and
a wick extending through the lid into the fluid chamber, wherein the wick is configured to transport fluid into and out of the fluid chamber.

19. The plant watering device of claim 18, further comprising a reservoir coupled to the lid.

* * * * *